United States Patent
Matsuura et al.

(10) Patent No.: US 8,912,794 B2
(45) Date of Patent: Dec. 16, 2014

(54) ANGLE DETECTING DEVICE

(75) Inventors: Mutsumi Matsuura, Kitasaku-gun (JP); Takashi Sano, Kitasaku-gun (JP); Kazuki Miyao, Kitasaku-gun (JP); Ryuta Sakamoto, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 280 days.

(21) Appl. No.: 13/432,892

(22) Filed: Mar. 28, 2012

(65) Prior Publication Data
US 2012/0262158 A1    Oct. 18, 2012

(30) Foreign Application Priority Data
Apr. 12, 2011 (JP) .................................. 2011-088208

(51) Int. Cl.
  *G01B 7/14* (2006.01)
  *G01D 5/20* (2006.01)
(52) U.S. Cl.
  CPC .................................... *G01D 5/2046* (2013.01)
  USPC .................................................. 324/207.25
(58) Field of Classification Search
  CPC ... G01D 5/145; G01D 5/2013; G01D 5/2046; G01P 3/487; H02K 29/06; H02K 29/08
  USPC .................................................. 324/207.25
  See application file for complete search history.

(56) References Cited

U.S. PATENT DOCUMENTS

| | | | |
|---|---|---|---|
| 4,794,511 A * | 12/1988 | Lundin | 363/156 |
| 2004/0263014 A1 * | 12/2004 | Miya | 310/168 |
| 2005/0122097 A1 | 6/2005 | Kitazawa | |
| 2005/0162155 A1 * | 7/2005 | Kujirai et al. | 324/207.25 |
| 2005/0212512 A1 * | 9/2005 | Matsuura et al. | 324/207.25 |
| 2005/0279180 A1 | 12/2005 | Aokii et al. | |
| 2006/0043815 A1 * | 3/2006 | Miya et al. | 310/216 |
| 2008/0036415 A1 * | 2/2008 | Kaizuka et al. | 318/730 |
| 2010/0213782 A1 * | 8/2010 | Nashiki et al. | 310/195 |
| 2011/0074400 A1 * | 3/2011 | Nakano et al. | 324/207.25 |

FOREIGN PATENT DOCUMENTS

| | | |
|---|---|---|
| JP | A-2005-164486 | 6/2005 |
| JP | A-2005-345454 | 12/2005 |
| JP | A-2006-250864 | 9/2006 |

\* cited by examiner

*Primary Examiner* — Patrick Assouad
*Assistant Examiner* — Demetrius Pretlow
(74) *Attorney, Agent, or Firm* — Oliff PLC

(57) ABSTRACT

An angle detecting device has a combined structure of plural resolvers, but is simple and is easily produced, and has redundancy reducing the risk of failure. The angle detecting device has two resolvers which are combined in the axial direction and has a stator core 100. The stator core 100 is formed by laminating a first stator core 103 on a second stator core 104. The first stator core 103 is provided with plural salient poles 101 which extend to a center of an axis. The second stator core 104 is provided with plural salient poles 102 which extend to the center of the axis. The salient poles 101 and 102 differ in position when viewed from the axial direction, and the salient poles 102 are positioned between the adjacent salient poles 101 when viewed from the axial direction.

2 Claims, 8 Drawing Sheets

ANGLE DETECTING DEVICE

BACKGROUND OF THE INVENTION

1. Field of the Invention

The present invention relates to an angle detecting device having a combined structure of two resolvers.

2. Description of Related Art

In order to have redundancy to reduce the risk of failure in an angle detecting device, a structure is disclosed in Japanese Unexamined Patent Application Laid-open No. 2006-250864, for example. In this structure, two resolvers are coaxially arranged in an axial direction. In addition, although it is not constructed to have the redundancy against failure, a resolver provided with two laminated stators is disclosed in Japanese Unexamined Patent Applications Laid-open Nos. 2005-164486 and 2005-345454.

According to the structure disclosed in Japanese Unexamined Patent Application Laid-open No. 2006-250864, two resolvers are simply coaxially combined. Therefore, two sets of the parts for the resolvers must be prepared, and the entire structure is not simple. In addition, an assembly process is complicated, thereby increasing the production cost. According to the techniques disclosed in Japanese Unexamined Patent Applications Laid-open Nos. 2005-164486 and 2005-345454, output windings are serially connected and form one resolver as a whole, whereby the redundancy against failure is not obtained.

SUMMARY OF THE INVENTION

In view of these circumstances, it is an object of the present invention to provide an angle detecting device having a combined structure of plural resolvers, but which is simple and is easily produced, and by which redundancy reducing the risk of failure is obtained.

According to a first aspect of the present invention, the present invention provides an angle detecting device including a rotor core, a stator core, and a plurality of salient poles. The rotor core is rotatable, and the stator core has an approximately tubular shape and has an inside accommodating the rotor core. The salient poles extend from the inside of the stator core to the rotor core. The stator core is formed of a first stator core and a second stator core. The salient poles of the first stator core are equiangularly provided in a circumferential direction and form a first salient pole group. The salient poles of the second stator core are equiangularly provided in a circumferential direction and form a second salient pole group. The salient poles of the first salient pole group and the salient poles of the second salient pole group are wound with an excitation winding, a sine winding, and a cosine winding, respectively. The sine winding and the cosine winding of the first salient pole group output signals as outputs of a first resolver, and the sine winding and the cosine winding of the second salient pole group output signals as outputs of a second resolver. The salient poles forming the first salient pole group and the salient poles forming the second salient pole group are arranged at different positions when viewed from an axial direction.

According to the first aspect of the present invention, the first salient pole group and the second salient pole group are arranged at different positions of the inside of one stator core in the axial direction. The portion formed with the first salient pole group functions as the first resolver, and the portion formed with the second salient pole group functions as the second resolver. According to this structure, a stator is not separated, whereby increase of the number of parts is prevented. In addition, the first salient pole group and the second salient pole group are arranged at different positions in the circumferential direction when viewed from the axial direction. Therefore, a process of winding the wires to each of the salient pole groups is easily performed compared with a case of other structures. Specifically, a space for inserting a nozzle of a winding machine, which automatically winds wires, is easily provided, whereby the winding process using the winding machine is more efficiently performed. In addition, the angle detecting device is easily reduced in dimensions.

According to a second aspect of the present invention, in the first aspect of the present invention, the salient pole of the second salient pole group is positioned in the middle of adjacent salient poles of the first salient pole group when viewed from the axial direction. According to the second aspect of the present invention, a space around the salient pole is most effectively obtained so as to wind the wires to each of the salient pole groups.

According to a third aspect of the present invention, in the first aspect of the present invention, the rotor core is formed of a first rotor core and a second rotor core which is laminated on the first rotor core. Each of the first rotor core and the second rotor core is provided with a plurality of magnetic poles which project in a radial direction. The magnetic poles of the first rotor core and the magnetic poles of the second rotor core differ in position by the same degree as the degree of the difference in position of the first salient pole group and the second salient pole group when viewed from the axial direction.

According to the third aspect of the present invention, the magnetic poles of the rotor core differ in position corresponding to the difference in position of the salient poles of the stator core when viewed from the axial direction. Therefore, the positional relationship between the salient poles of the stator core and the magnetic poles of the rotor core is the same in the two resolver portions. Accordingly, a reference position (zero point) for measuring an angle is easily set in outputs of the two resolvers.

According to a fourth aspect of the present invention, in the first aspect of the present invention, the first salient pole group and the second salient pole group are wound with a common excitation winding. The common excitation winding is wound at a first salient pole of the first salient pole group and is then wound at a first salient pole of the second salient pole group. The first salient pole of the second salient pole group is adjacent to the first salient pole of the first salient pole group in the circumferential direction when viewed from the axial direction. Next, the common excitation winding is wound at a second salient pole of the first salient pole group, which is adjacent to the first salient pole of the second salient pole group in the circumferential direction when viewed from the axial direction. The common excitation winding is wound by repeating this procedure. According to the fourth aspect of the present invention, the salient poles of the stator cores of the two resolvers have a common excitation winding, whereby a terminal treatment of the wire is simple.

According to a fifth aspect of the present invention, in the first aspect of the present invention, the first resolver formed of the first salient pole group and the second resolver formed of the second salient pole group have a shaft angle multiplier that differs by 1.

According to the fifth aspect of the present invention, the shaft angle multipliers of the coaxially-arranged two resolvers differ by 1. Therefore, an output signal that is the same as in a revolver with a shaft angle multiplier of 1× is obtained. Accordingly, a sine wave detection signal and a cosine wave detection signal of one cycle are obtained per rotation, whereby an absolute angle of the rotation angle of the rotor core is calculated.

According to the present invention, an angle detecting device having a combined structure of plural resolvers is provided. Nevertheless, the angle detecting device has a simple structure and is easily produced, and also has redundancy reducing the risk of failure.

PREFERRED EMBODIMENTS OF THE INVENTION (1) First Embodiment
(1-1) Structure

Figure 1:
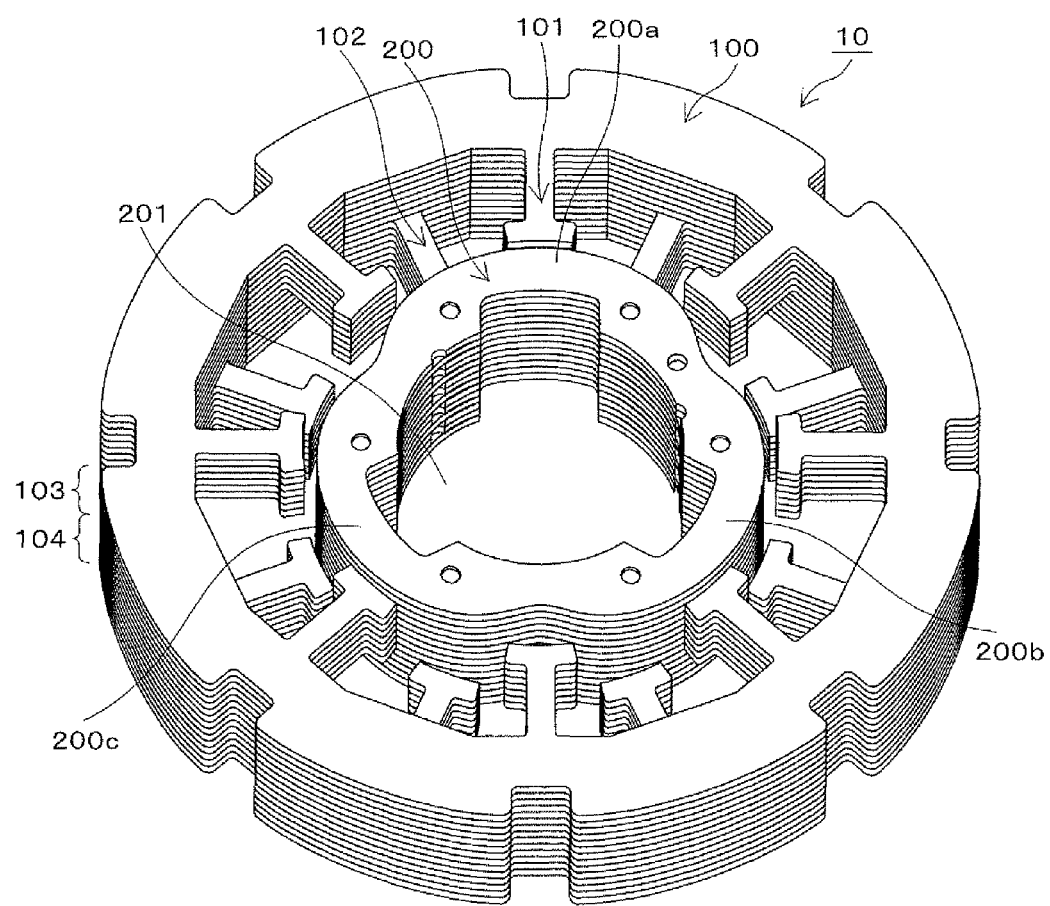
FIG. 1 is a perspective view of a stator core and a rotor core of an embodiment.
Figure 2:
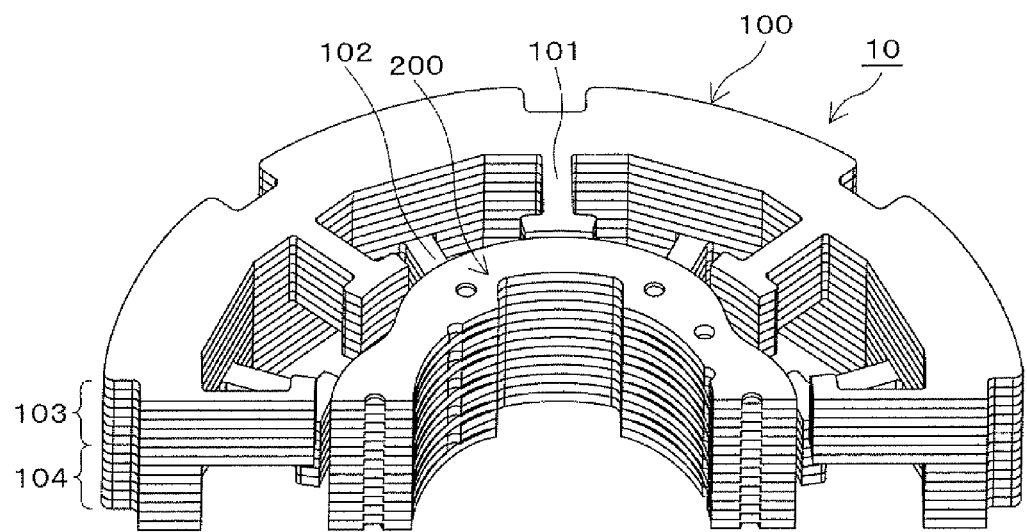
FIG. 2 is a perspective cross section of a stator core and a rotor core of an embodiment.
Figure 3:
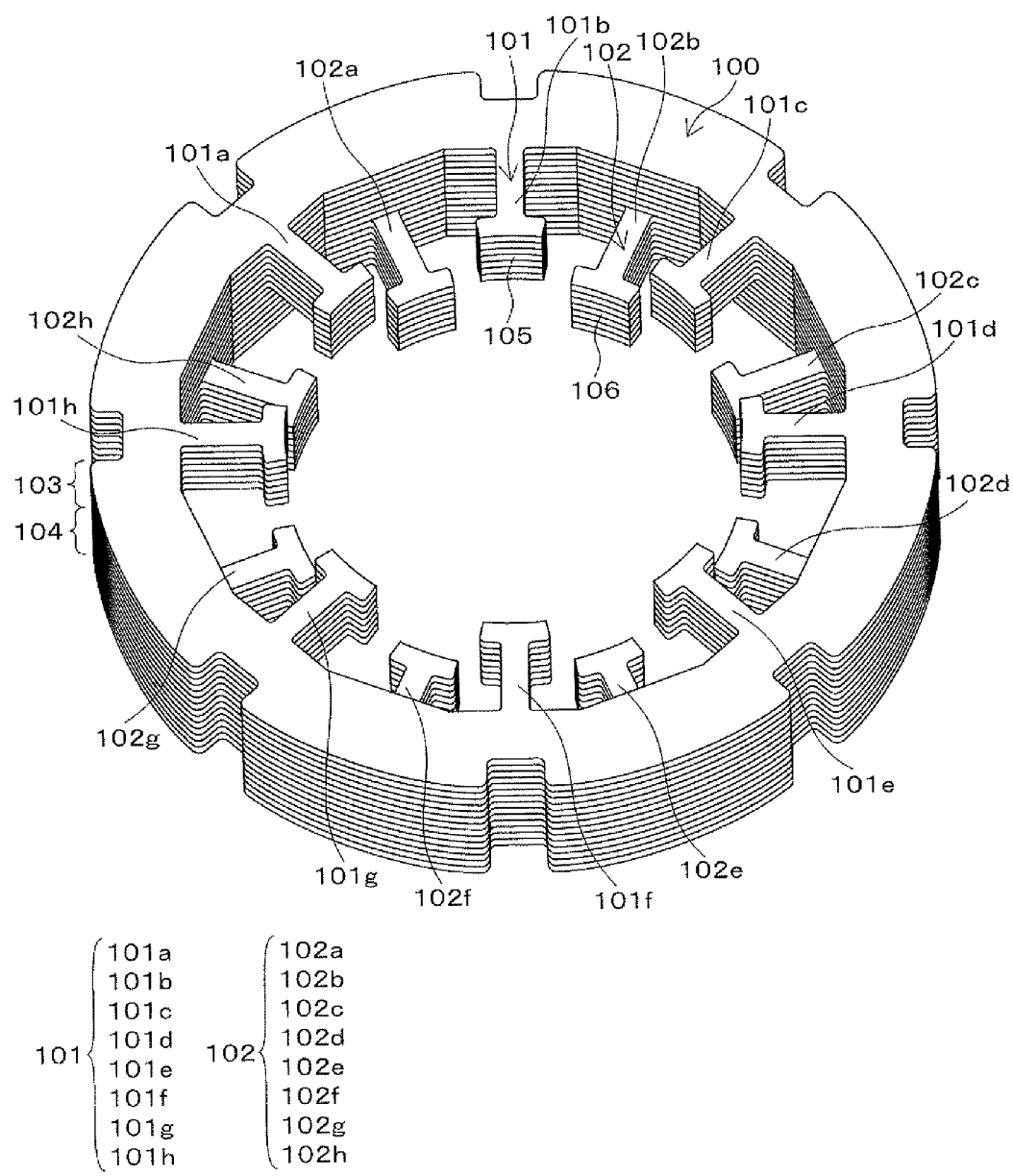
FIG. 3 is a perspective view of a stator core of an embodiment.

An angle detecting device of an embodiment will be described hereinafter. In the embodiments, a combined structure of two VR (Variable Reluctance) resolvers with a shaft angle multiplier of 3× is described. FIG. 1 is a perspective view showing an arranged condition of a stator core and a rotor core of the angle detecting device of the embodiment. FIG. 2 is a perspective cross section of the stator core and the rotor core shown in FIG. 1, which is cut at a surface including an axis. FIG. 3 is a perspective view of the stator core.

FIGS. 1 and 2 show a stator core 100 and a rotor core 200 that form an angle detecting device 10 of the embodiment. Although not shown in FIGS. 1 and 2, the angle detecting device 10 is also provided with an excitation winding, a sine winding, a cosine winding, and a rotating shaft. Moreover, the angle detecting device is further provided with a housing and a casing for accommodating the stator core 100, a bearing provided to the housing so as to rotatably hold the rotating shaft, lead terminals of the windings, and the like.

The stator core 100 is formed by laminating plural soft magnetic thin sheets that are punched. The stator core 100 has an approximately cylindrical shape with low height in the axial direction and is provided with salient poles 101 and 102 which extend from the inner circumferential surface to the center of the axis (to the rotor core 200). The salient poles 101 form a first salient pole group, and as shown in FIG. 3, eight salient poles 101a to 101h are arranged along the circumferential direction at predetermined positions in the axial direction. In addition, the salient poles 101a to 101h are equiangularly arranged when viewed from the axial direction. That is, for example, the salient poles 101a and 101b are adjacent in the circumferential direction and are arranged at an angular position which differs by 45 degrees when viewed from the axial direction. This structure is also used in the salient poles 102, which will be described later. The number of the salient poles that are equiangularly arranged in the circumferential direction is not limited to the eight of this example. The general shape of the stator core 100 is not limited to the cylindrical shape and may be a tubular shape with a polygonal outside.

The salient poles 102 form a second salient pole group, and as shown in FIG. 3, eight salient poles 102a to 102h are arranged along the circumferential direction at different positions from those of the salient poles 101 in the axial direction. The salient poles 102a to 102h are also equiangularly arranged when viewed from the axial direction. That is, for example, the salient poles 102a and 102b are adjacent in the circumferential direction and are arranged at an angular position which differs by 45 degrees when viewed from the axial direction.

The salient poles 101 and 102 differ in the angular position by 22.5 degrees when viewed from the axial direction. That is, the salient pole 102a is positioned (viewed) in the middle of the adjacent two salient poles 101a and 101b when viewed from the axial direction. Therefore, the difference in the angular position of the salient poles 101a and 102a is 22.5 degrees when viewed from the axial direction. This is the same as in the case of the other salient poles. The difference in the angular position of the salient poles 101 and 102 viewed from the axial direction is calculated from 180 degrees/N in which N is the number of the salient poles 101 and 102.

Each of the salient poles 101 extending to the center of the axis has a top portion with an umbrella shape when viewed from the axial direction. The top portion is provided with a salient pole surface 105 in the side of the rotor core 200. The salient pole surface 105 is curved and faces the rotor core 200. As in the case of the salient poles 101, each of the salient poles 102 extending to the center of the axis has a top portion that is provided with a salient pole surface 106. The salient pole surface 106 is also curved and faces the rotor core 200.

FIG. 1 shows the rotor core 200 accommodated in the stator core 100. The rotor core 200 is formed by laminating plural soft magnetic thin sheets which are punched and are formed into the shape shown in FIG. 1. The rotor core 200 has magnetic poles 200a, 200b, and 200c, which are equiangularly arranged (in this case, three angular positions that differ by 120 degrees) and are projected (raised) in a radial direction when viewed from the axial direction. The rotor core 200 also has a hollow portion 201 at the center portion. The hollow portion 201 is made so as to be mounted with a rotating shaft, which is not shown in figures. The rotor core 200 is rotatably arranged at the stator core 100 and has a gap between the rotor core 200 and both the salient pole surfaces 105 of the salient poles 101 and the salient pole surfaces 106 of the salient poles 102 so as not to contact them. The angle detecting device 10 in this embodiment measures rotation angle of the rotating shaft (not shown in figures) mounted to the rotor core 200. The number of the magnetic poles that are equiangularly arranged in the circumferential direction (shaft angle multiplier) is not limited to the three of this example. The difference in the angular position of the magnetic poles 200a, 200b, and 200c is calculated from 360 degrees/M in which M is the number of the shaft angle multiplier (M is a natural number of not less than 2).

Figure 4:
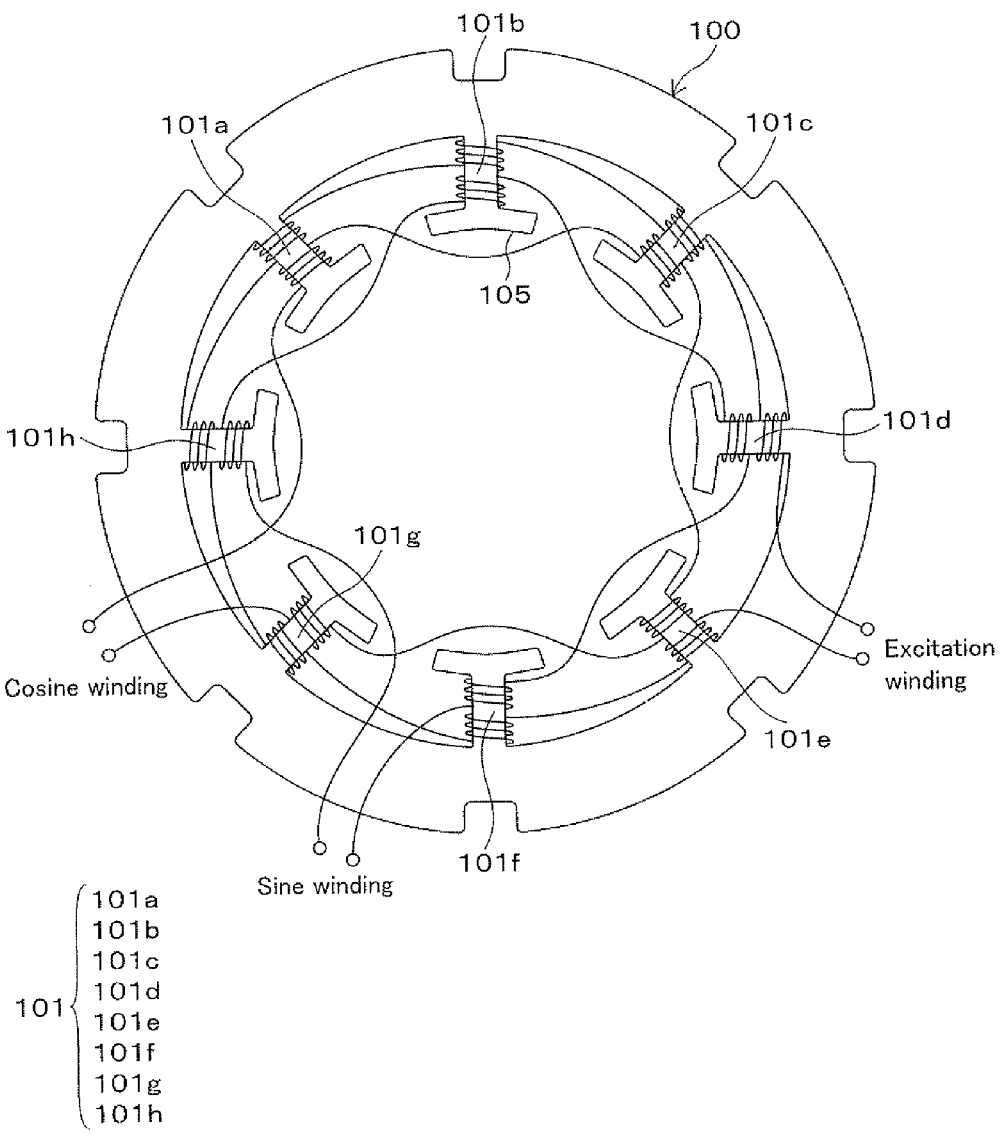
FIG. 4 is an actual wiring diagram showing a method of winding an excitation wire, a sine wave detection wire, and a cosine wave detection wire to salient poles of a stator core.

FIG. 4 shows an example of a winding condition of the excitation winding, the sine winding, and the cosine winding, to the salient poles 101. In order to simply illustrate the winding condition, the salient poles 102 are not shown in FIG. 4. In addition, an insulator for insulating the stator core 100 and the salient poles 101 from the windings is also not shown in FIG. 4.

In the example shown in FIG. 4, the salient poles 101 of the first salient pole group are formed of eight salient poles 101a, 101b, 101c, 101d, 101e, 101f, 101g, and 101h. The excitation winding is serially wound at the salient poles 101a to 101h in order. In the example shown in FIG. 4, the winding of the excitation wire starts from the salient pole 101e in a clockwise direction and ends at the salient pole 101d. That is, the excitation winding is wound at the salient pole 101e and is then wound at the salient pole 101f. Next, the excitation winding is wound at the salient pole 101g and is then wound at the salient pole 101h. Then, the excitation winding is wound at the salient pole 101a and is wound at the salient pole 101b. Finally, the excitation winding is wound at the salient pole 101c and is then wound at the salient pole 101d, and is led from the stator core 100.

The sine winding and the cosine winding may be wound at all of the salient poles as in the case of the excitation winding or may be wound at alternate salient poles as shown in FIG. 4. That is, the sine winding is serially wound at the alternate salient poles of the salient pole 101h, the salient pole 101b, the salient pole 101d, and the salient pole 101f, in order. The cosine winding is serially wound at the alternate salient poles of the salient pole 101a, the salient pole 101c, the salient pole 101e, and the salient pole 101g, in order. The directions of winding the wires to each of the salient poles are the same in FIG. 4 in order to simplify illustration, but they are not limited thereto.

Although not shown in FIG. 4, the method of winding the wires at the salient poles 102 is the same as that for the salient poles 101 shown in FIG. 4. Since the salient poles 101 and 102 differ in position by 22.5 degrees in the circumferential direction when viewed from the axial direction, the windings are wound at positions that also differ by 22.5 degrees in the circumferential direction when viewed from the axial direction.

According to the winding method exemplified in FIG. 4, the excitation winding, the sine winding, and the cosine winding for the salient poles 101 (first stator core) and for the salient poles 102 (second stator core) are separated. As each of the windings has two leading wires, a total of 12 wires are led from the stator core 100 to the outside.

Figure 5:
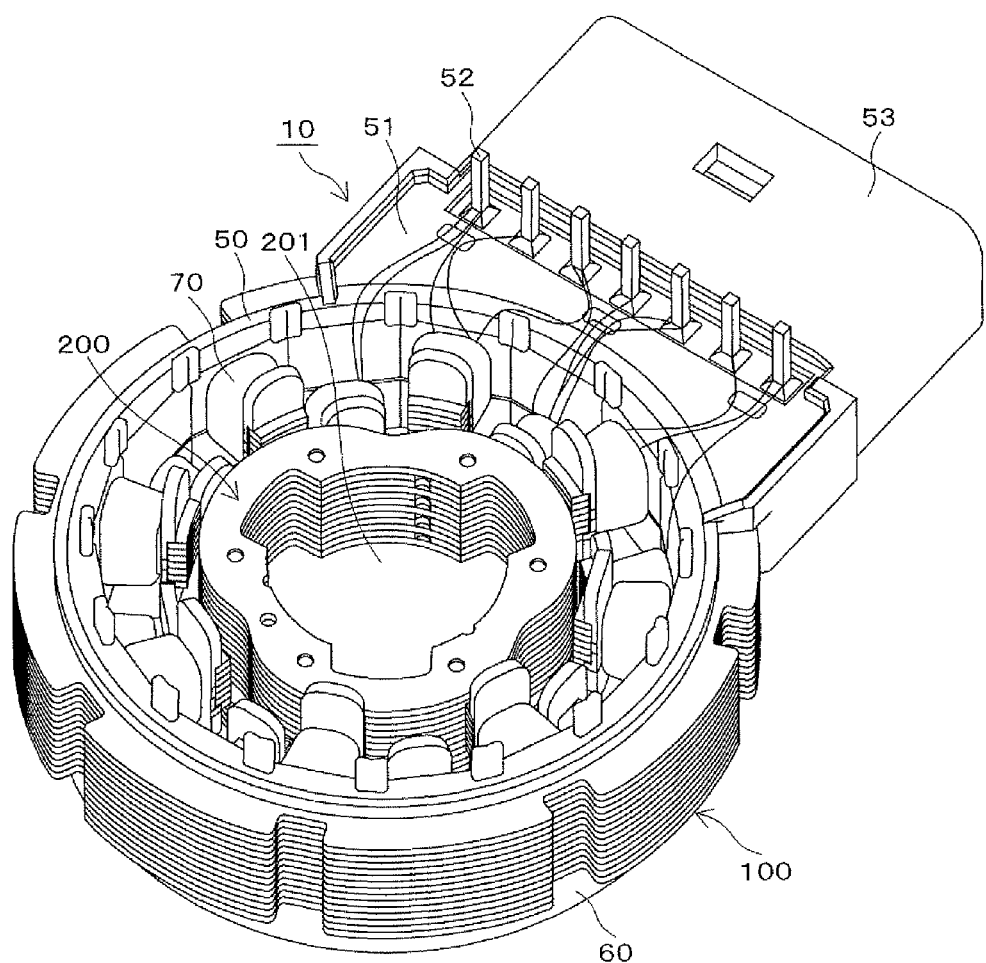
FIG. 5 is a perspective view of an angle detecting device of an embodiment.

FIG. 5 shows an overview of an angle detecting device 10 using the structure shown in FIGS. 1 to 4. The angle detecting device 10 shown in FIG. 5 is formed by fitting insulators 50 and 60 to the structure in a condition shown in FIG. 1 from the top and bottom in the axial direction. Moreover, a coil 70 is wound at each salient pole, and leading wires from the coil 70 are connected to terminals 52. The coil 70 is collectively indicated in FIG. 5, but specifically, the coil 70 is formed by the winding method shown in FIG. 4. The insulator 50 has a terminal block 51 including the terminals 52 and has a connector cover 53 extending from the terminal block 51. The connector cover 53 contains a connector connected to the terminals 52, which is not shown in FIG. 5. The connector is formed so as to connect to a connecting cable from a microcomputer 501 in FIG. 6.

FIG. 5 shows a condition of the angle detecting device 10 in which a rotating shaft is not mounted at the hollow portion 201 of the rotor core 200, and a bearing for rotatably holding the rotating shaft, a housing for holding the bearing, and an outer case are removed.

(1-2) Production Method

A process for forming the structure shown in FIG. 1 and a process for winding the wires to the salient poles will be described hereinafter. First, silicon steel sheets are punched so as to obtain structural components of the stator core 100 having a flat shape shown in FIG. 3. The structural component of the stator core 100 has a sheet shape and is made by uniformly forming a circumferential circular portion and eight salient poles 101 or 102 which extend from the circular portion to the center. In this process, sheet components for forming a first stator core 103 and sheet components for forming a second stator core 104 are produced. Then, the sheet components having the same shape are laminated, whereby the first stator core 103 and the second stator core 104 are respectively formed. Moreover, the first stator core 103 and the second stator core 104 are laminated, whereby the stator core 100 is obtained. Thus, the stator core 100 shown in FIGS. 1 and 2 is obtained.

After a stator core 100 having the structure shown in FIG. 1 is obtained, an insulator (not shown in FIG. 1) is fitted to the stator core 100 so as to prevent short-circuiting of the stator core 100 and the windings. As a result, the surfaces of the stator core 100 at portions which will contact the windings are covered with an insulation. Alternatively, the surface of the stator core 100 may be coated with an insulating material, whereby the stator core 100 is insulated from the windings.

After the insulating treatment is performed on the stator core 100, the stator core 100 is set on a winding machine. Then, wires of the excitation winding, the sine winding, and the cosine winding are wound at each salient pole by the winding method described in connection with FIG. 4. That is, by using the winding machine, the excitation winding, the sine winding, and the cosine winding are wound at the salient poles 101 of the first stator core 103, and the excitation winding, the sine winding, and the cosine winding are wound at the salient poles 102 of the second stator core 104. In this case, the salient poles 101 and 102 differ in position when viewed from the axial direction and are alternately staggered in the axial direction. Therefore, a moving area of a nozzle of the winding machine is easily obtained, whereby the winding process is easily performed by the winding machine. In regard to this, the winding process is easily performed by the winding machine even when the stator core 100 is small in its dimensions. Thus, the stator core 100, in which each of the salient poles is wound with the windings by the winding method shown in FIG. 4, is obtained.

On the other hand, silicon steel sheets are punched and are formed into the flat shape of the rotor core 200 shown in FIGS. 1 and 2, whereby sheet components for forming the rotor core 200 are obtained. By laminating plural sheet components, a rotor core 200 is formed. After the rotor core 200 is obtained, a rotating shaft is mounted to the hollow portion 201 so that the rotor core 200 is rotatably held in the stator core 100. In this case, there are two sets of the excitation winding, the sine winding, and the cosine winding, and their wires are led out and are terminated. Accordingly, an angle detecting device 10 having an internal structure shown in FIG. 5 (the rotating shaft is not shown in FIG. 5) is obtained.

(1-3) Angle Detecting System

Figure 6:
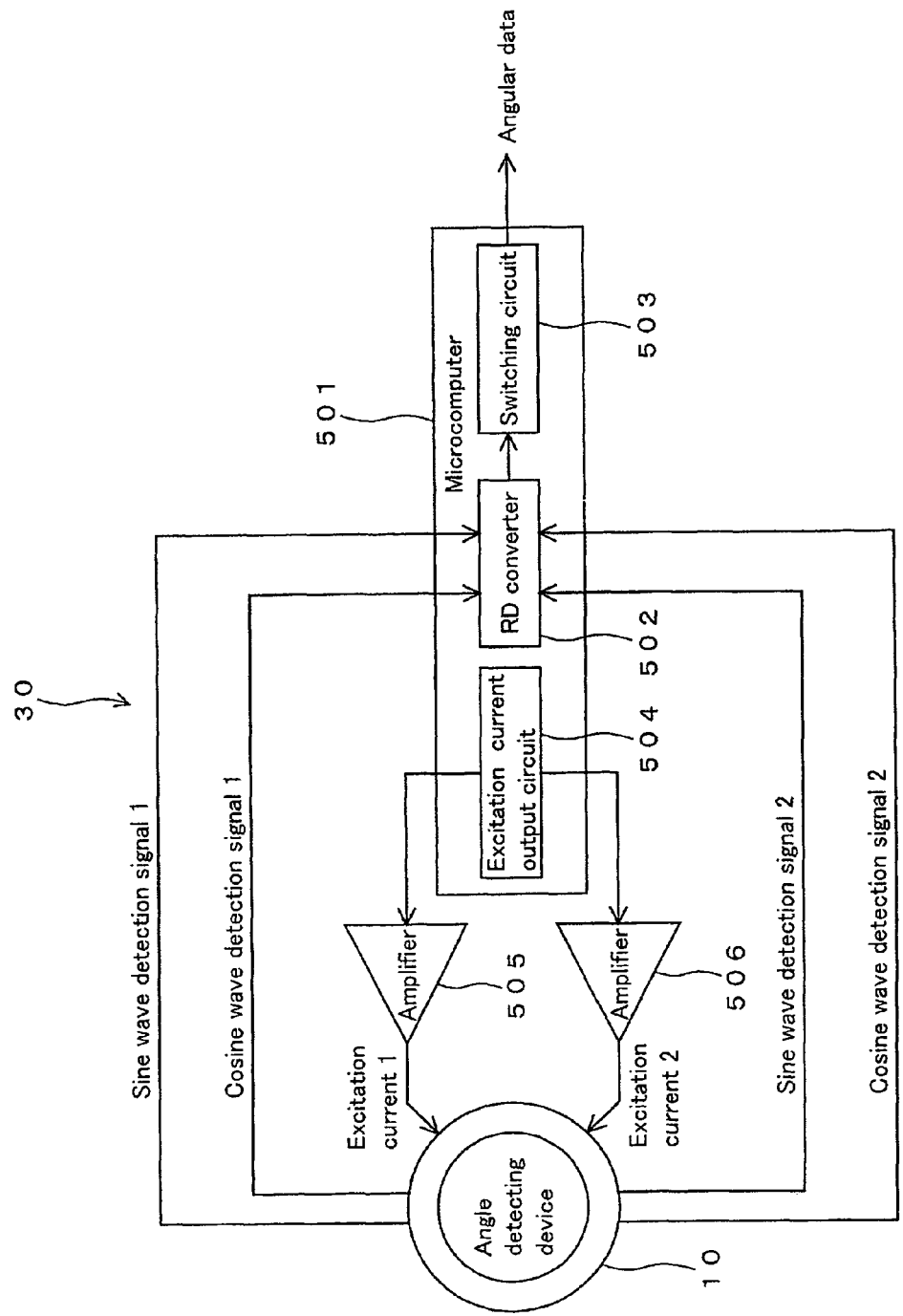
FIG. 6 is a block diagram of an angle detecting system of an embodiment.

FIG. 6 shows an example of an angle detecting system using the angle detecting device 10 in FIG. 5. The angle detecting system 30 shown in FIG. 6 is provided with a microcomputer 501 which has an RD (Resolver-digital) converter 502, a switching circuit 503, and an excitation current output circuit 504. The RD converter 502 calculates a rotation angle of the rotor core 200 of the angle detecting device 10 based on a sine wave detection signal 1 and a cosine wave detection signal 1 output from the angle detecting device 10. The sine wave detection signal 1 is obtained from the sine winding wound at the salient poles 101. The cosine wave detection signal 1 is obtained from the cosine winding wound at the salient poles 101. The RD converter 502 also calculates a rotation angle of the rotor core 200 of the angle detecting device 10 based on a sine wave detection signal 2 and a cosine wave detection signal 2 output from the angle detecting device 10. The sine wave detection signal 2 is obtained from the sine winding wound at the salient poles 102. The cosine wave detection signal 2 is obtained from the cosine winding wound at the salient poles 102.

The switching circuit 503 selects one of the angular data of the above two routes, which are calculated by the RD converter 502, and outputs the selected data to the outside. When the selected data is abnormal, the switching circuit 503 selects and outputs the other data as a normal signal. The excitation current output circuit 504 outputs excitation current to two lines. The excitation currents are amplified by an amplifier 505 or 506, respectively, and are separately supplied to each of the excitation windings of the angle detecting device 10.

(1-4) Example of Operation

For example, the function of the windings of the first stator core 103 shown in FIG. 4 will be described. In this case, a high-frequency current of sin ωt of several kilohertz to several hundred kilohertz is supplied to the excitation winding of the salient poles 101. Then, in the salient poles 101, induced current of sin θ sin ωt (sine wave detection signal 1) flows in the sine winding, and induced current of cos θ cos ωt (cosine wave detection signal 1) flows in the cosine winding. Here, θ is the rotation angle of the rotor core 200. Since the shaft angle multiplier is 3×, the induced currents are periodically changed at three times while the rotor core 200 rotates once. The rotation angle of the rotor core 200 is calculated based on the induced currents of the two phases by the RD converter 502 in FIG. 6. This function is the same as in the windings of the second stator core 104. That is, when the excitation current is supplied to the excitation winding, induced currents (sine wave detection signal 2 and cosine wave detection signal 2) flow in the sine winding and the cosine winding, respectively. The RD converter 502 calculates the rotation angle of the rotor core 200 based on these induced currents.

(1-5) Redundant Function Against Failure

The RD converter 502 in FIG. 6 calculates the rotation angle of the rotor core 200 based on the outputs of the windings of the first stator core 103 in FIG. 1. Simultaneously, the RD converter 502 calculates the rotation angle of the rotor core 200 based on the outputs of the windings of the second stator core 104. In this condition, the switching circuit 503 in FIG. 6 may be set to select the value that is calculated based on the outputs of the windings of the first stator core 103.

The following case may be anticipated. That is, a part of the windings of the first stator core 103 is cut or has contact failure at the connection, whereby at least one of the outputs from the sine winding and the cosine winding wound at the salient poles 101 is not obtained. In this case, the switching circuit 503 in FIG. 6 switches to a mode for selecting the output of the RD converter 502, which is based on the outputs of the windings of the second stator core 104 in FIG. 1. Accordingly, an angular data calculated based on the normal stator core is selected, whereby redundancy against failure is obtained.

(1-6) Other Uses

The angle detecting device of the present invention includes two resolvers with respect to one shaft, and the resolvers are stacked in the axial direction and measure the shaft angle respectively. By using this function, the rotation angle can be measured at different positions of the shaft, and torsion of the shaft can be detected. The function of detecting the torsion of the shaft can be utilized in an electric power steering system in a vehicle so as to assist a driver in controlling the steering. In this case, the angle detecting device of the present invention is mounted to the steering shaft and is used to detect the torsion of the steering shaft from the difference of the outputs of the two resolvers. The torsion is proportional to torque applied to the steering shaft. Therefore, according to the torsion data of the steering shaft, power for assisting turning of the steering shaft can be controlled.

(1-7) Advantages

According to the structure in this embodiment, the two VR resolvers are stacked in the axial direction and provide a first pair of the sine wave detection signal and the cosine wave detection signal and a second pair of the sine wave detection signal and the cosine wave detection signal, respectively. Therefore, even when the output of one of the resolvers ceases for some reason or is abnormal, the rotation angle can be measured based on the output of the other resolver. Accordingly, redundancy that reduces the risk of failure is obtained.

Moreover, the salient poles of the first resolver (first salient pole group) and the salient poles of the second resolver (second salient pole group) differ in position when viewed from the axial direction. Specifically, the salient pole of the second resolver is positioned in the middle of the adjacent salient poles of the first resolver when viewed from the axial direction. In addition, the salient poles of the first resolver and the salient poles of the second resolver are alternately staggered in the axial direction. Therefore, a space for inserting the nozzle of the winding machine for winding the wires to the salient poles is obtained, and the winding process for the excitation winding, the sine winding, and the cosine winding is easily performed by the winding machine. Specifically, even when the entire angle detecting device is reduced in dimensions, the winding efficiency of the winding machine is superior.

(2) Second Embodiment

Figure 7:
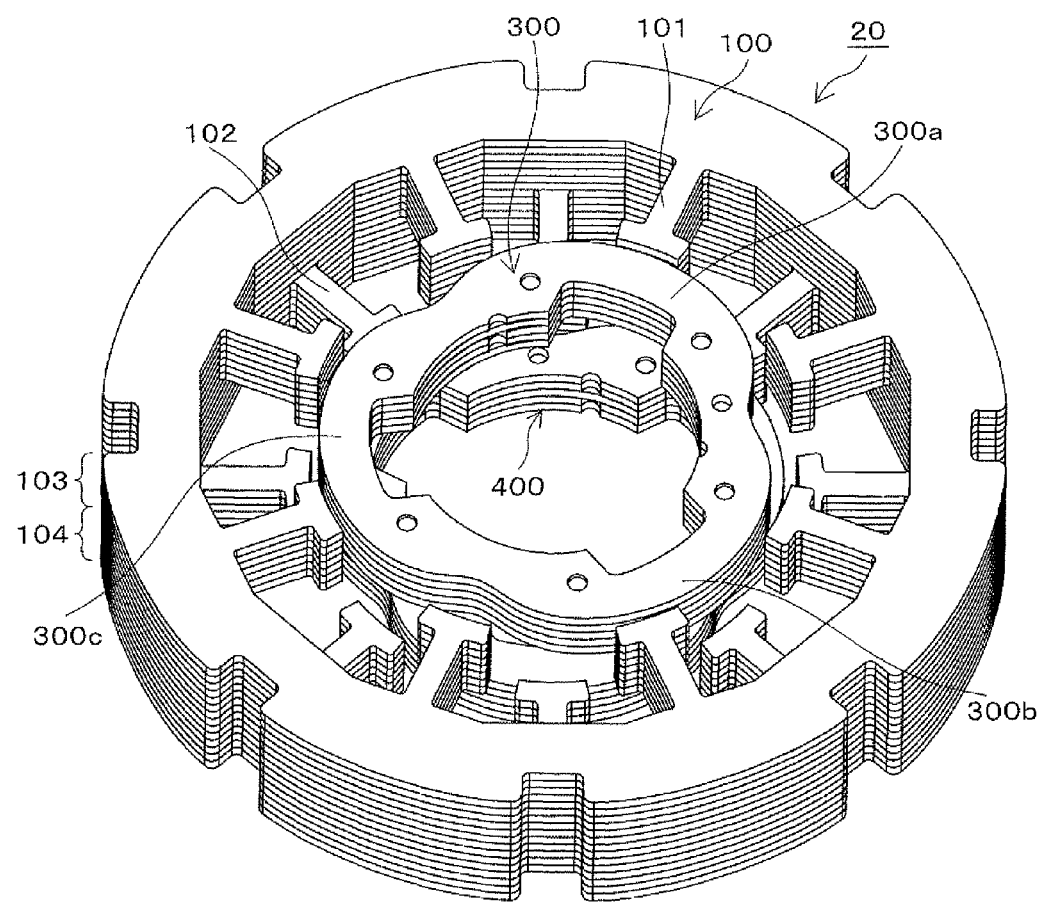
FIG. 7 is a perspective view of a stator core and a rotor core of another embodiment.
Figure 8:
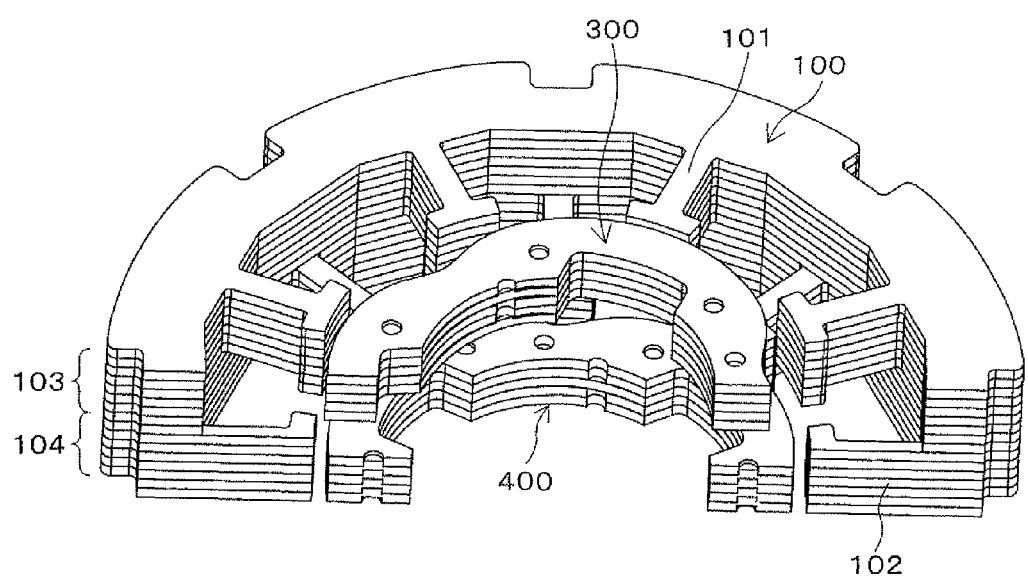
FIG. 8 is a perspective cross section of a stator core and a rotor core of another embodiment.

FIG. 7 exemplifies a stator core and a rotor core, which has a different structure from that in the First Embodiment, of an angle detecting device 20. FIG. 8 shows a cross section of the stator core and the rotor core shown in FIG. 7, which is cut at a surface that includes an axis and is parallel to the axis. FIGS. 7 and 8 show a stator core 100 and show a first rotor core 300 and a second rotor core 400 accommodated in the stator core 100. The stator core 100 is the same as the above stator core 100 which has eight salient poles arranged in the circumferential direction and is described with FIGS. 1 to 3.

In this embodiment, a rotor core with a shaft angle multiplier of 3× is formed by laminating the first rotor core 300 on the second rotor core 400 in the axial direction. The first rotor core 300 and the second rotor core 400 have the same shape as that of the rotor core 200 in FIG. 2, but they differ in position by 22.5 degrees, when viewed from the axial direction. This corresponds to the positions of the salient poles 101 and 102 which differ by 22.5 degrees in the axial direction when viewed from the axial direction.

In the structure shown in FIG. 7, a relative position between the salient poles 101 and three magnetic poles 300a, 300b, and 300c of the first rotor core 300 is the same as the relative position between the salient poles 102 and three magnetic poles of the second rotor core 400. That is, the positional relationship between the poles of the stator core and the poles of the rotor core in the side of the first stator core 103 is the same as the positional relationship between the poles of the stator core and the poles of the rotor core in the side of the stator core 104. By forming such a structure, a reference point for detection of a signal obtained from the first stator core 103 is easily made to correspond to a reference point for detection of a signal obtained from the second stator core 104. The method of winding the wires to the salient poles and the detection function of the rotation angle of the rotor core are the same as in the case of the First Embodiment. The number of the salient poles equiangularly arranged to the stator core in the circumferential direction is not limited to the number in this embodiment. Similarly, the number of the magnetic poles equiangularly arranged to the rotor core in the circumferential direction (shaft angle multiplier) is not limited to the number in this embodiment.

In the structure shown in FIG. 7, the second rotor core 400 is rotated by 22.5 degrees with respect to the first rotor core 300 when viewed from the axial direction. This angular position is not limited to 22.5 degrees and may be another angle such as 30 degrees or 45 degrees. In this case, a means is required so that the reference point of detection signal obtained from the first stator core 103 corresponds to the reference point of detection signal obtained from the second stator core 104. This can be performed by modifying the method of winding the wires to the salient poles 101 and 102 and the signal processing of the detection signals.

(3) Third Embodiment

In the First Embodiment shown in FIGS. 1 to 3 and the Second Embodiment shown in FIGS. 7 and 8, the first stator core 103 and the second stator core 104 may have a common excitation winding. This example will be described with reference to FIG. 3, hereinafter. In this case, the excitation winding is successively wound so as to alternately connect the salient poles 101 of the first stator core 103 and the salient poles 102 of the second stator core 104. For example, the excitation winding is wound at the salient pole 101a, the salient pole 102a, the salient pole 101b, the salient pole 102b, the salient pole 101c, . . . , in order. First, the excitation winding is wound at the salient pole 101a of the salient pole group of the first stator core 103. Then, the excitation winding is wound at the salient pole 102a of the second stator core 104, which is adjacent to the salient pole 101a in the circumferential direction when viewed from the axial direction. Next, the excitation winding is wound at the salient pole 101b of the first stator core 103, which is adjacent to the salient pole 102a in the circumferential direction when viewed from the axial direction. Moreover, the excitation winding is wound at the salient pole 102b of the second stator core 104, which is adjacent to the salient pole 101b in the circumferential direction when viewed from the axial direction. Thus, the excitation winding is alternately wound.

According to this structure of the excitation winding, the excitation windings of the two routes are unified, whereby the number of leading wires for the excitation windings is reduced. Therefore, a terminal treatment related to the excitation windings and leading portions to the outside are simplified. In addition, steps of wiring and winding the excitation winding are reduced.

(4) Fourth Embodiment

In the structures of the First Embodiment and the Second Embodiment, the top and the bottom resolvers may have a different shaft angle multiplier. For example, in the structure shown in FIG. 7, the first stator core 103 and the first rotor core 300 may have a structure of a VR resolver with a shaft angle multiplier of 3×. On the other hand, the second stator core 104 and the second rotor core 400 may have a structure of a VR resolver with a shaft angle multiplier of 2×. In this case, the number of the salient poles of each stator core, the winding method, and the structure of each rotor core are set to correspond to the above shaft angle multiplier.

In a case of coaxially arranging two resolvers with a shaft angle multiplier which differs by 1, an absolute angle is detected based on the difference of the outputs thereof (detection signal as in a resolver with a shaft angle multiplier of 1× is output). As the output is separately obtained from each of the resolvers, even when one of the resolvers breaks down, the data of rotation angle of the rotor core can be obtained as long as the other is normal. Therefore, redundancy reducing the risk of failure is also obtained in this case.

(5) Other Examples

The embodiment of the present invention is not limited to each of the above embodiments and may include various modifications that can be anticipated by a person skilled in the art. The effects of the present invention are also not limited to the descriptions above. That is, various additions, changes, and partial deletions can be performed in a range that does not exceed the general concept and object of the present invention, which are derived from the descriptions recited in the Claims and equivalents thereof.

The present invention can be used for angle detecting apparatuses.

What is claimed is:

1. An angle detecting device comprising:
a rotor core that is rotatable;
a stator core having an approximately tubular shape and having an inside accommodating the rotor core; and
a plurality of salient poles extending from the inside of the stator core to the rotor core,
wherein the stator core is formed of a first stator core and a second stator core,
the salient poles of the first stator core are equiangularly provided in a circumferential direction and form a first salient pole group, and the salient poles of the second stator core are equiangularly provided in a circumferential direction and form a second salient pole group,
the salient poles of the first salient pole group and the salient poles of the second salient pole group are wound with an excitation winding, a sine winding, and a cosine winding, respectively,
the sine winding and the cosine winding of the first salient pole group output signals as outputs of a first resolver, and the sine winding and the cosine winding of the second salient pole group output signals as outputs of a second resolver,
the salient poles of the first salient pole group and the salient poles of the second salient pole group are arranged at different positions when viewed from an axial direction,
the salient pole of the second salient pole group is positioned in a middle of adjacent salient poles of the first salient pole group when viewed from the axial direction,
the rotor core is formed of a first rotor core and a second rotor core which is laminated on the first rotor core,
each of the first rotor core and the second rotor core is provided with a plurality of magnetic poles which project in a radial direction, and
the magnetic poles of the first rotor core and the magnetic poles of the second rotor core differ in position by a same degree as a degree of a difference in position of the first salient pole group and the second salient pole group when viewed from the axial direction.

2. The angle detecting device according to claim 1, wherein the first resolver formed of the first salient pole group and the second resolver formed of the second salient pole group have a shaft angle multiplier that differs by 1.

* * * * *